(No Model.)
A. WOODWARD.
MILK BUCKET.
No. 271,293. Patented Jan. 30, 1883.
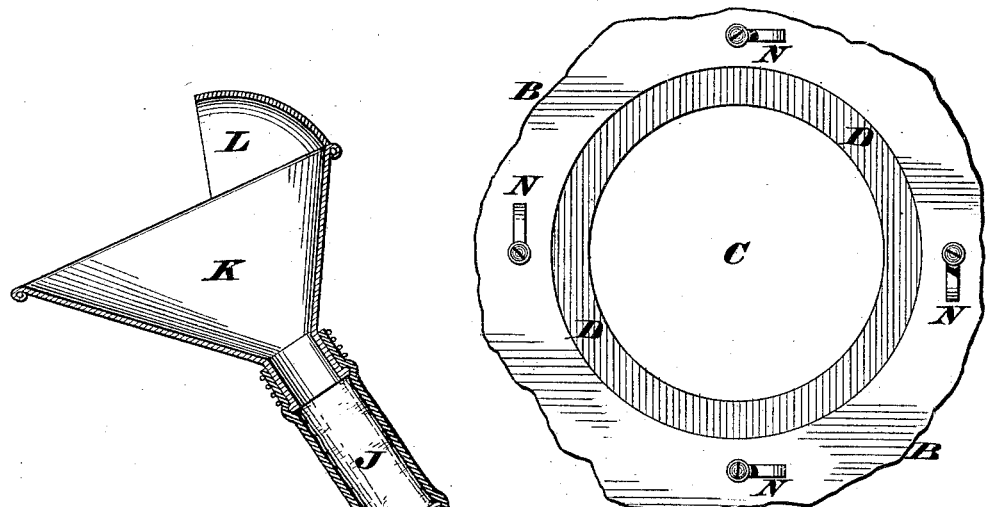
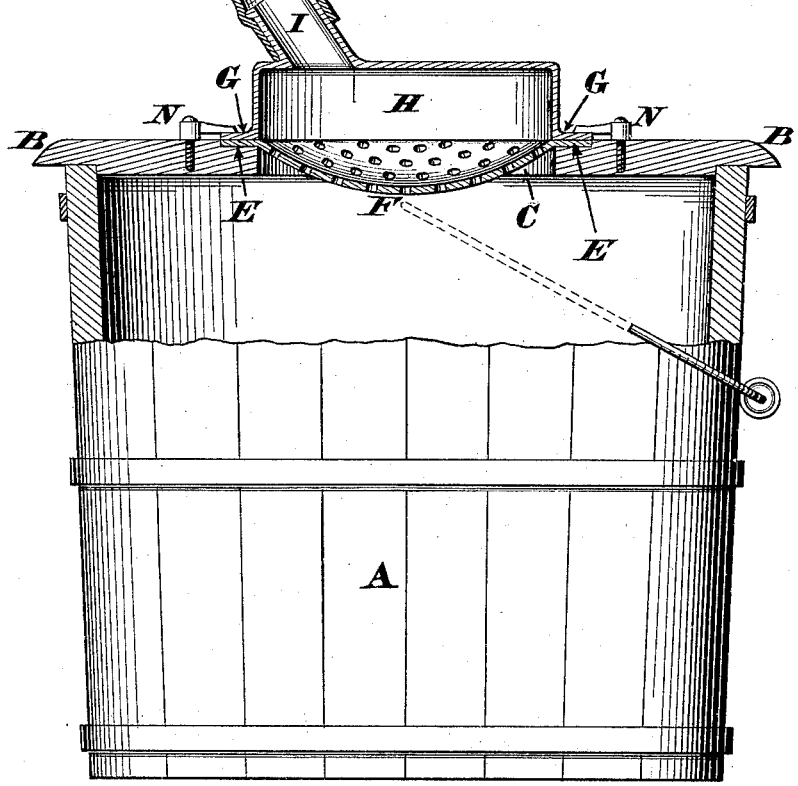
Attest:
Sam. D. Carpenter
John R. Frohliger
Inventor.
Abner Woodward
by James H. Layman
Attorney
N. PETERS, Photo-Lithographer, Washington, D. C.

UNITED STATES PATENT OFFICE.

ABNER WOODWARD, OF SHELBURNE FALLS, MASSACHUSETTS.

MILK-BUCKET.

SPECIFICATION forming part of Letters Patent No. 271,293, dated January 30, 1883.

Application filed July 29, 1882. (No model.)

*To all whom it may concern:*

Be it known that I, ABNER WOODWARD, a citizen of the United States, residing at Shelburne Falls, in the county of Franklin and State of Massachusetts, have invented certain new and useful Improvements in Milk-Buckets, of which the following is a specification.

The peculiar combination of devices embraced in my invention will first be described, and then pointed out in the claims.

In the annexed drawings, Figure 1 is a sectionized elevation of my improved milk-bucket. Fig. 2 is a plan of the central portion of the lid, the strainer and its accessories being detached therefrom.

A represents the bucket or pail, of any suitable size, shape, and material, said pail having a lid or cover, B, preferably of wood. This lid has an opening, C, flanked at top by an annular pit or recess, D, which latter receives the annular rim E of a dished strainer, F, of any proper material. Adapted to rest snugly on the rim E is an annular base-flange, G, of a chamber, H, which is closed at top, but open at bottom, and is provided with a short neck, I, inclining upwardly at any suitable angle. Fitted to this neck is a rubber hose or other flexible tube, J, the upper end of which carries a funnel, K, having a hood, L, that prevents milk splashing into the face of the operator.

N N represent turn buttons or clips or other convenient devices for retaining the strainer E F and chamber G H in their proper positions on the lid B.

To use my bucket the annular rim E of strainer F is seated in the pit D, and chamber H is then applied so as to cause its flange G to rest on said rim, after which act the buttons or clips N N are turned around to the position seen in Fig. 1. It is evident the strainer and chamber are now securely clamped to the lid, and the lid being then applied to the bucket, the latter is at once ready for use. The milk, after being discharged from the cow directly into funnel K L, runs down the hose J and neck I into the chamber H, where it has an opportunity to disperse without escaping from said chamber. Consequently the milk flows freely through the dished strainer F into bucket A, the flexible connection J enabling the operator to change the position of said funnel so as to follow the movements of the cow. After the animal has been milked the buttons N can be turned and the strainer E F and chamber G H can be detached from the lid and cleaned with the utmost facility. If preferred, the lower end of hose J can be coupled to a pipe capable of sliding within the neck I, in order that the funnel K L can be either raised or lowered to suit the height of the cow; or the same result can be accomplished by adjusting the hose up or down on a somewhat extended neck of chamber H. Finally, if it is desired to attach the strainer and chamber permanently to the lid it can be done by simply screwing down through the flanges E and G, between which members a packing-ring may be clamped.

I claim as my invention—

1. The combination of lid B C, annular flanged strainer E F, and annular flanged chamber G H, the latter having a neck, I, and said strainer and chamber being attached to the lid, substantially in the manner herein described.

2. The combination of lid B C, annular pit D, strainer E F, chamber G H, and neck I, said strainer and chamber being retained in position by the turn-buttons N, or their equivalents, substantially as described.

In testimony whereof I affix my signature in presence of two witnesses.

ABNER WOODWARD.

Witnesses:
 H. A. STOWE,
 F. S. BURLING.